(12) United States Patent
Shim et al.

(10) Patent No.: US 9,790,877 B2
(45) Date of Patent: Oct. 17, 2017

(54) METHOD AND APPARATUS FOR CONTROLLING EGR

(71) Applicant: Doosan Infracore Co., Ltd., Incheon (KR)

(72) Inventors: Eui Joon Shim, Gyeonggi-do (KR); Young Deok Han, Seoul (KR); Seung Hyup Shin, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 82 days.

(21) Appl. No.: 14/654,938

(22) PCT Filed: Dec. 13, 2013

(86) PCT No.: PCT/KR2013/011616
§ 371 (c)(1),
(2) Date: Jun. 23, 2015

(87) PCT Pub. No.: WO2014/104628
PCT Pub. Date: Jul. 3, 2014

(65) Prior Publication Data
US 2015/0345415 A1 Dec. 3, 2015

(30) Foreign Application Priority Data
Dec. 26, 2012 (KR) .................. 10-2012-0153021

(51) Int. Cl.
*F02D 41/00* (2006.01)
*F02D 21/08* (2006.01)
(Continued)

(52) U.S. Cl.
CPC ......... *F02D 41/0072* (2013.01); *F02D 21/08* (2013.01); *F02D 41/0052* (2013.01);
(Continued)

(58) Field of Classification Search
CPC ............ F02D 41/0072; F02D 41/0065; F02D 41/0077; F02D 21/08; F02D 2014/0075;
(Continued)

(56) References Cited

U.S. PATENT DOCUMENTS 4,041,913 A * 8/1977 Nohira .................... F02D 21/08
123/568.2
4,142,493 A * 3/1979 Schira ................. F02D 41/0077
123/486

(Continued)

FOREIGN PATENT DOCUMENTS

CN 1415049 A 4/2003
EP 0965740 12/1999
(Continued)

OTHER PUBLICATIONS

International Search Report with English Translation dated Mar. 4, 2014 for corresponding International Application No. PCT/KR2013/011616, 5 pages.

(Continued)

*Primary Examiner* — Hieu T Vo
*Assistant Examiner* — Sherman Manley
(74) *Attorney, Agent, or Firm* — John D. Veldhuis-Kroeze; Westman, Champlin & Koehler, P.A.

(57) ABSTRACT

A method of controlling exhaust gas recirculation (EGR) for controlling recirculation of exhaust gas discharged from a combustion chamber of an engine includes: a data obtaining operation of obtaining data about an engine state and a gas supply state; a current EGR rate calculating operation of calculating a current EGR rate of supply gas based on the data; a demand EGR rate setting operation of setting a demand EGR rate matched with the data in a pre-made target EGR rate map; an error calculating operation of calculating a difference between the demand EGR rate and the current (Continued)

EGR rate; and a control operation of making the current EGR rate follow the demand EGR rate by changing a recirculation rate of the exhaust gas by adjusting an inhalation side pressure of the supply gas according to the difference.

4 Claims, 6 Drawing Sheets

(51) Int. Cl.
*F02M 26/06* (2016.01)
*F02D 41/18* (2006.01)

(52) U.S. Cl.
CPC ..... *F02D 41/0065* (2013.01); *F02D 41/0077* (2013.01); *F02D 41/0057* (2013.01); *F02D 41/18* (2013.01); *F02D 2041/0017* (2013.01); *F02D 2041/0075* (2013.01); *F02M 26/06* (2016.02); *Y02T 10/47* (2013.01)

(58) Field of Classification Search
CPC .. F02D 2014/0017; Y02T 10/47; F02M 26/06
See application file for complete search history.

(56) References Cited

U.S. PATENT DOCUMENTS

| | | | |
|---|---|---|---|
| 4,177,777 A * | 12/1979 | Maruyama | F02D 41/0072 123/568.27 |
| 4,466,416 A * | 8/1984 | Kawamura | F02D 9/02 123/378 |
| 5,002,031 A * | 3/1991 | Kako | F02D 41/0065 123/478 |
| 5,520,161 A | 5/1996 | Klopp | |
| 6,148,616 A * | 11/2000 | Yoshida | F02B 37/24 60/605.2 |
| 6,178,749 B1 * | 1/2001 | Kolmanovsky | F02B 37/18 60/605.2 |
| 6,227,182 B1 * | 5/2001 | Muraki | F02D 21/08 123/568.21 |
| 6,370,935 B1 | 4/2002 | He et al. | |
| 6,880,524 B2 | 4/2005 | Gates et al. | |
| 2002/0129800 A1 * | 9/2002 | Russell | F02D 41/0072 123/568.16 |
| 2003/0192517 A1 * | 10/2003 | Gates | F02D 11/10 123/568.16 |
| 2006/0020386 A1 | 1/2006 | Kang | |
| 2010/0071674 A1 * | 3/2010 | Rabe | F02D 41/0077 123/568.11 |
| 2011/0029220 A1 * | 2/2011 | Sasaki | F02B 37/24 701/106 |
| 2011/0054763 A1 * | 3/2011 | Oehlerking | F02D 41/0007 701/108 |
| 2012/0037134 A1 * | 2/2012 | Jankovic | F02D 41/0002 123/568.21 |

FOREIGN PATENT DOCUMENTS

| | | |
|---|---|---|
| EP | 0982486 A2 | 3/2000 |
| FR | 2813098 A1 | 2/2002 |
| FR | 2954407 A1 | 6/2011 |
| GB | 2328294 A | 2/1999 |
| JP | S62-233465 A | 10/1987 |
| JP | H11-200907 A | 7/1999 |
| JP | 2011-522159 A | 7/2011 |
| KR | 10-1987-0010301 A | 11/1987 |
| KR | 10-1997-0006816 A | 2/1997 |
| KR | 10-2011-0063169 A | 6/2011 |
| KR | 10-2011-0138919 A | 12/2011 |
| WO | 2009/148917 A2 | 12/2009 |

OTHER PUBLICATIONS

Japanese Office Action dated May 23, 2016 for Japanese Application No. 2015-546398, 3 pages.
European Search Report dated Jul. 21, 2016 for European Application No. 13868718.1, 7 pages.
Chinese Office Action dated Jul. 25, 2017 for Chinese Application No. 201380067962.2, 7 pages.
European Office Action dated Aug. 1, 2017 for European Application No. 13868718.1, 6 pages.

* cited by examiner

[FIG. 1]
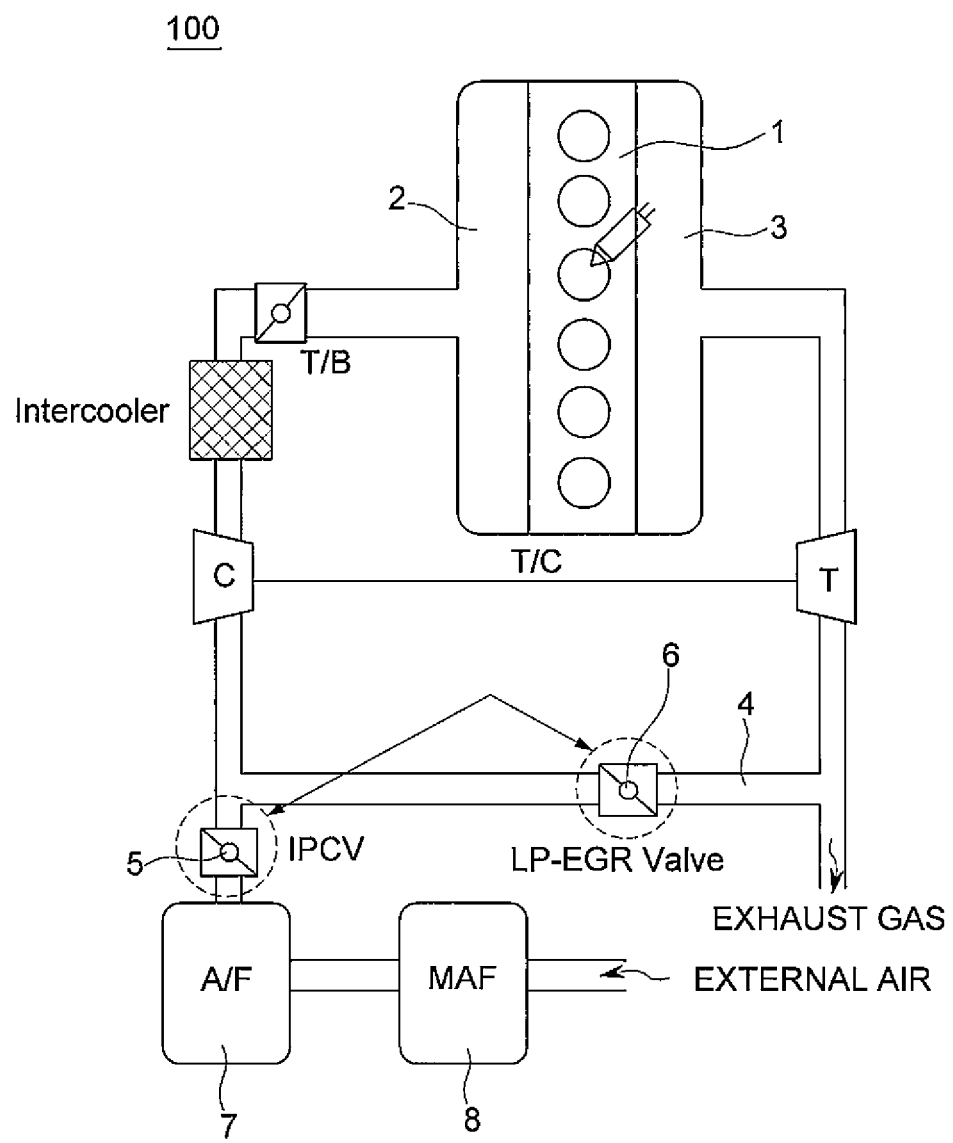

[FIG. 2]
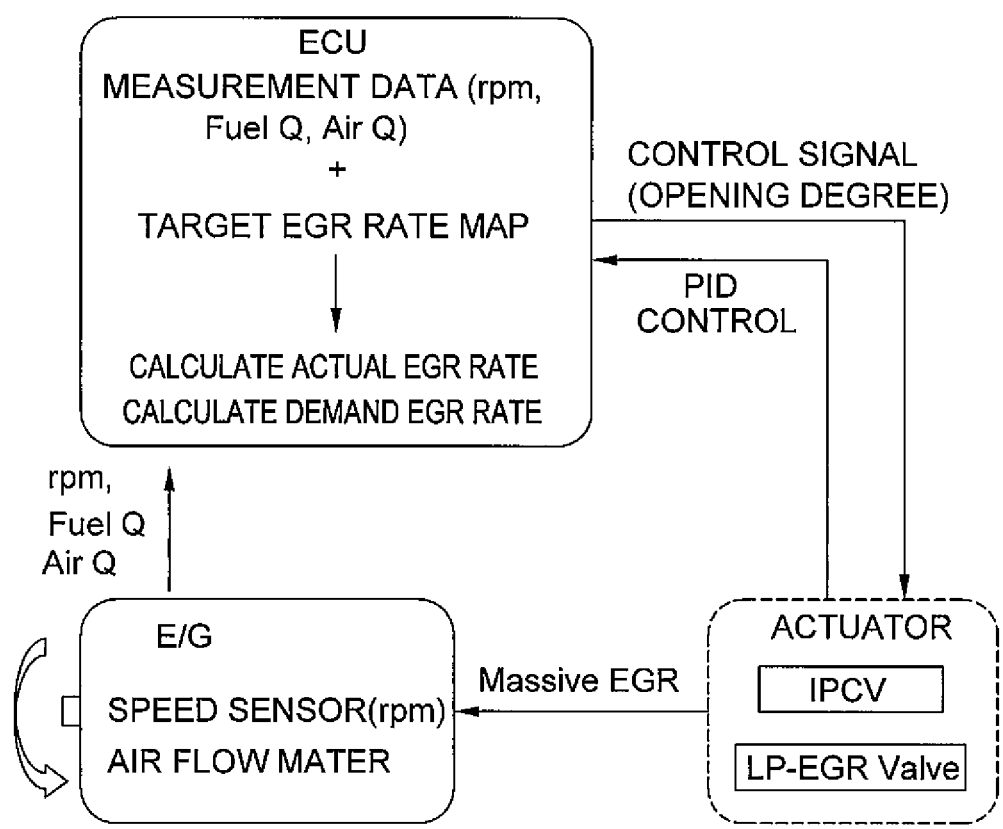

[FIG. 3]
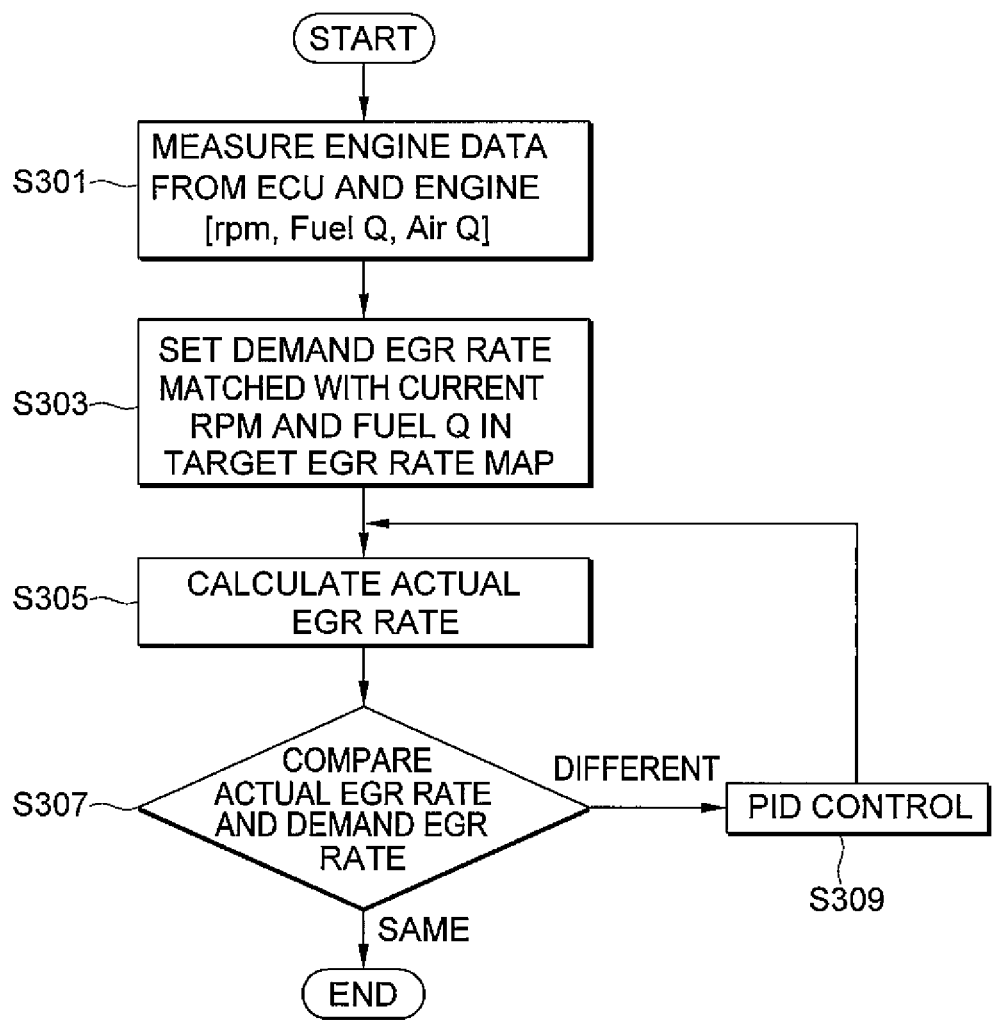

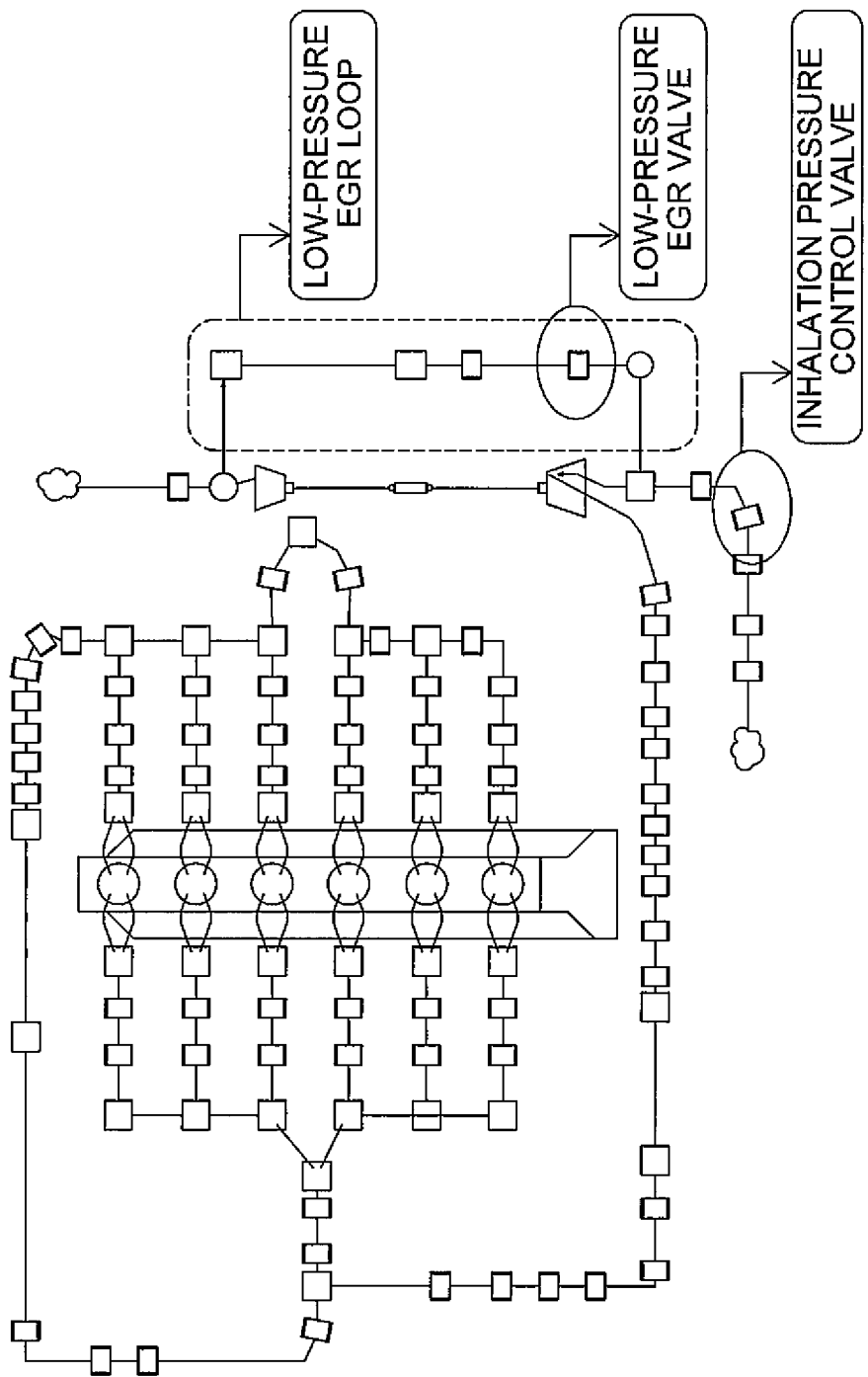
[FIG. 4]

[FIG. 5]
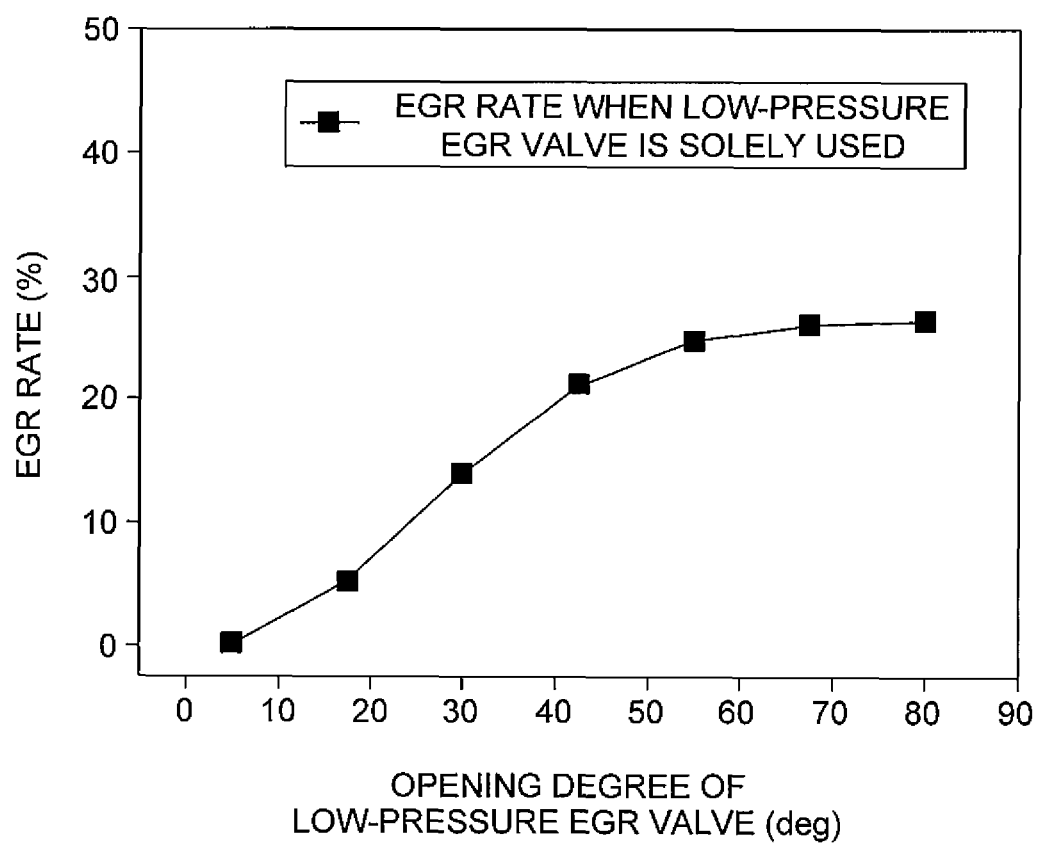

[FIG. 6]
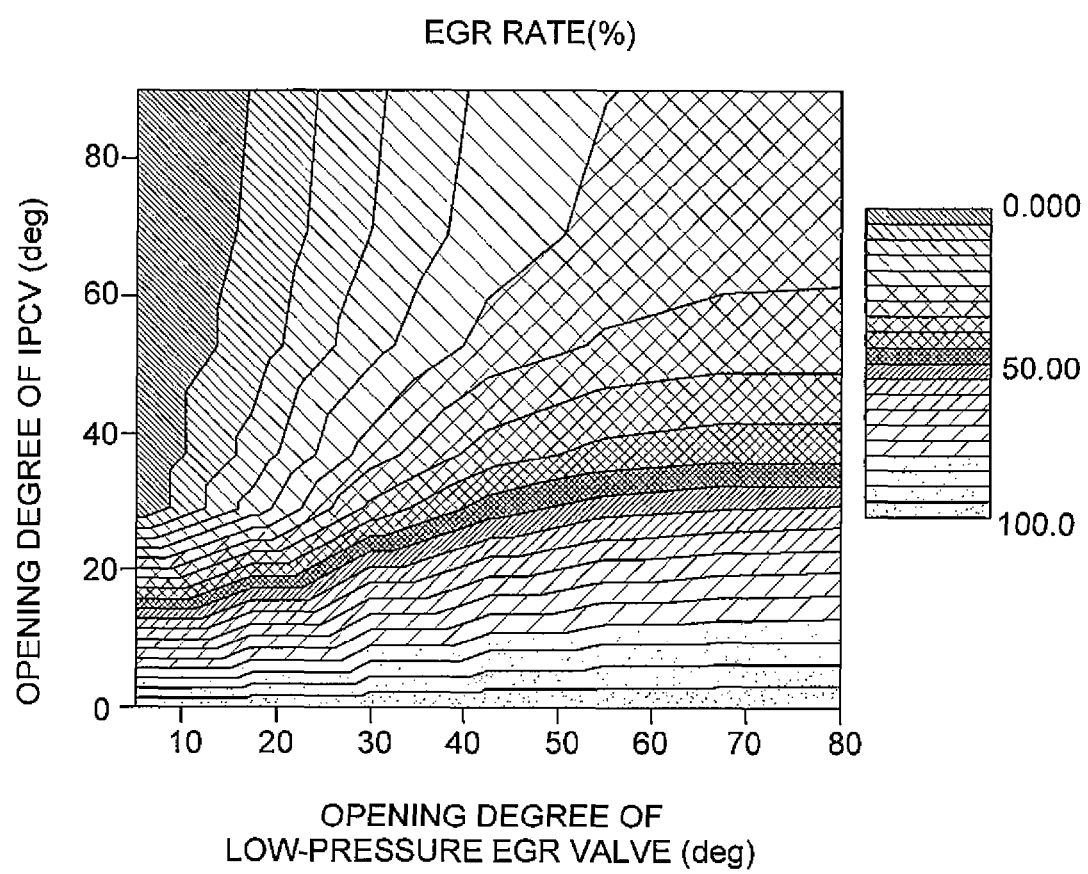

METHOD AND APPARATUS FOR CONTROLLING EGR

CROSS-REFERENCE TO RELATED APPLICATION

This Application is a Section 371 National Stage Application of International Application No. PCT/KR2013/011616, filed Dec. 13, 2013 and published, not in English, as WO 2014/104628 on Jul. 3, 2014.

FIELD OF THE DISCLOSURE

The present disclosure relates to control of exhaust gas recirculation (hereinafter, referred to as "EGR") that recirculates exhaust gas discharged after combustion in a combustion system, such as a diesel engine, and more particularly to a control method and apparatus that are capable of supplying a large amount of EGR to a combustion chamber so as to implement low temperature combustion.

BACKGROUND OF THE DISCLOSURE

Low temperature combustion technology is new combustion technology capable of remarkably reducing exhausted emissions, such as soot and NOx, which are problems in a combustion system, such as a large diesel engine, and in order to practically use the low temperature combustion technology, it is necessary to precisely control a large amount of EGR most of all. To this end, a low pressure or high pressure EGR supply system in the related art adopts a scheme in which an EGR gas supply path and a high pressure EGR valve are provided to a rear end of a turbo charger, and a supply rate of EGR gas supplied to a combustion chamber is adjusted by controlling the EGR valve.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

However, in the scheme in the related art, an EGR rate is only a level of 0 to 40%, so that there is a limit in providing the EGR rate of 60% or more, which is necessary for implementing low temperature combustion, and the EGR rate is subordinately varied according to a change in an operating point of auxiliary machinery, such as a turbo charger, so that there occurs a problem in that it is impossible to accurately control an EGR rate. The problem has been a large obstacle to practically use low temperature combustion technology.

The present disclosure is conceived so as to solve the problems in the related art, and an object of the present disclosure is to provide a control method which is capable of stably securing an EGR flow rate for implementing low temperature combustion by expanding a control range of EGR, and precisely controlling the amount of EGR by using only a low-pressure EGR supply system without being subordinate to other auxiliary machinery.

In order to achieve the aforementioned object, an exemplary embodiment of the present disclosure provides a method of controlling exhaust gas recirculation (EGR) for controlling recirculation of exhaust gas discharged from a combustion chamber of an engine, comprising: a data obtaining operation of obtaining data about an operation state of the engine; a current EGR rate calculating operation of calculating a current EGR rate of supply gas based on the data; a demand EGR rate setting operation of setting a demand EGR rate matched with the data in a pre-made target EGR rate map; an error calculating operation of calculating a difference between the demand EGR rate and the current EGR rate; and a control operation of making the current EGR rate follow the demand EGR rate by changing a recirculation rate of the exhaust gas by adjusting an inhalation side pressure of the supply gas according to the difference.

The data about the operation state of the engine may include rpm, a fuel supply quantity, and an inhalation air quantity of the engine.

The control operation may be performed by mutually adjusting an opening degree of an inhalation pressure control valve, which is provided at an inhalation side of the supply gas and adjusts an inhalation negative pressure, and an opening degree of an EGR valve, which is provided at a discharge side of the exhaust gas and introduces the exhaust gas to the inhalation side of the supply gas.

The exhaust gas may be introduced to the inhalation side of the supply gas along an EGR supply path branched from the discharge side of the exhaust gas, and the EGR supply path may form an independent loop that is not subordinate to auxiliary machinery, such as a turbo charger.

The control operation may include controlling the current EGR rate to satisfy the demand EGR rate by proportional-integral derivative (PID) control using an actual measurement value of an inhalation air quantity and the target EGR rate map.

In order to achieve the aforementioned object, another exemplary embodiment of the present disclosure provides an apparatus for controlling exhaust gas recirculation (EGR), including: an engine including a speed sensor and an air flow meter; an actuator configured to control opening degrees of an inhalation pressure control valve and an EGR valve; and an engine control unit configured to obtain data about an operation state of the engine from the engine, calculate an actual EGR rate and a demand EGR rate based on the obtained data and a pre-stored target EGR rate map, and transmit a control signal to the actuator when there is a difference between the actual EGR rate and the demand EGR rate as a result of the calculation, in which the engine control unit makes a current EGR rate follow the demand EGR rate by changing a recirculation quantity of exhaust gas by adjusting a pressure of an inhalation side of supply gas according to the difference.

The data about the operation state of the engine may include rpm, a fuel supply quantity, and an inhalation air quantity of the engine.

According to the present disclosure, it is possible to expand a control range of an EGR rate by mutually adjusting an opening degree of a low-pressure EGR valve and an opening degree of an inhalation pressure control valve (IPCV), thereby stably supplying a large EGR flow rate for implementing low temperature combustion.

Further, a high-pressure EGR valve system in the related art has a subordinate relation with auxiliary machinery, such as a turbo charger, in controlling the EGR rate, but the low-pressure EGR valve system used in the present disclosure structurally solves the aforementioned problem, so that it is possible to independently control the EGR rate and precisely controlling the EGR.

DESCRIPTION OF THE DRAWINGS

FIG. 1 is a diagram schematically illustrating a structure of an EGR control system according to an exemplary embodiment of the present disclosure.

FIG. 2 is a diagram illustrating a concept of an EGR control logic according to the exemplary embodiment of the present disclosure.

FIG. 3 is a flowchart illustrating the EGR control logic according to the exemplary embodiment of the present disclosure.

FIG. 4 is a diagram illustrating a numerical value interpretation model of the EGR control system according to an exemplary embodiment of the present disclosure.

FIG. 5 is a graph illustrating a result of the numerical value interpretation when a low-pressure EGR valve is solely used.

FIG. 6 is a diagram illustrating a result of the numerical value interpretation when an opening degree of the low-pressure EGR valve and an opening degree of an IPCV are simultaneously controlled.

DETAILED DESCRIPTION

Hereinafter, an exemplary embodiment of the present disclosure will be described in detail with reference to the accompanying drawings.

FIG. 1 is a diagram schematically illustrating a structure of an exhaust gas recirculation (EGR) control system according to an exemplary embodiment of the present disclosure.

Referring to FIG. 1, an EGR control system 100 according to an exemplary embodiment of the present disclosure includes an inhalation pressure control valve (IPCV) 5 installed at an inhalation manifold 2 side, which supplies external air sucked through a mass air flow meter (MAF) 8 and an air filter (A/F) 7 to a combustion chamber 1, and adjusting an inhalation negative pressure, and an EGR valve 6 installed in an EGR supply path 4 branched from an exhaust manifold 3 side, and introducing exhaust gas combusted in and discharged from the combustion chamber 1 to the inhalation manifold 2 side. The EGR valve 6 may be, for example, a low-pressure EGR valve (LP-EGR valve). Further, the EGR supply path 4 may form a lower pressure EGR loop (LP-EGR Loop) that is not subordinate to auxiliary machinery, such as a turbo charger.

The EGR control system 100 of the present exemplary embodiment is characterized in that the adjustment of an EGR flow rate supplied to the combustion chamber 1 is not dependent on only the EGR valve 6, but a control range of the EGR is expanded to be larger than a limit (0 to 40%) in the related art by adjusting two variables including an opening degree (duty) of the EGR valve 6 and an opening degree of an inhalation pressure control valve 5.

FIG. 2 is a diagram illustrating a concept of an EGR control logic according to the exemplary embodiment of the present disclosure.

Referring to FIG. 2, an engine control unit (ECU) obtains measurement data about rpm, a fuel quantity (Fuel Q), and an air quantity (Air Q) of an engine from a speed sensor, an air flow meter, and the like provided in the engine (E/G), and calculates an actual EGR rate and a demand EGR rate based on the measurement data and an autonomously stored target EGR rate map. As a result of the calculation, when there is a difference between the actual EGR rate and the demand EGR rate, the ECU transmits a control signal to an actuator so as to make the actual EGR rate follow the demand EGR rate. Based on the control signal, the large quantity of EGR satisfying the demand EGR rate is supplied to the engine by adjusting the opening degree of the inhalation pressure control valve (IPCV) and the opening degree of the EGR valve (for example, the low-pressure EGR valve (LP-EGR valve)). Further, in order to perform accurate control in accordance with the demand EGR rate, proportional-integral-derivative (PID) control using an actual measurement value of an inhalation air quantity and the target EGR rate map may be performed.

FIG. 3 is a flowchart illustrating the EGR control logic according to the exemplary embodiment of the present disclosure.

Referring to FIG. 3, the engine control unit (ECU) obtains information, for example, current rpm information and actual fuel quantity (Fuel Q) information, based on which a target EGR rate or a demand EGR rate for low temperature combustion may be calculated, from the engine (S301).

Next, the engine control unit (ECU) sets a demand EGR rate matched with the current rpm and the actual fuel quantity (Fuel Q) in the target EGR rate map which is prepared by a previous experiment in advance (S303).

Table 1 below represents a target EGR rate map (%) according to the exemplary embodiment of the present disclosure.

TABLE 1

| Fuel Q | RPM | | | |
|---|---|---|---|---|
| | 800 | 1200 | 1600 | 2000 |
| 10 | 50 | 60 | 65 | 68 |
| ... | ... | ... | ... | ... |
| 100 | 58 | 62 | 67 | 70 |

Next, a current actual EGR rate is calculated based on a fresh air quantity (Air Q) measured by the flow meter and a non-EGR air Q table in the ECU (S305). Here, the actual EGR rate is a value obtained by subtracting the measurement value by the flow meter from the air rate calculated based on the non-EGR air quantity table, and is calculated by Equation 1 below.

$$\text{Actual } EGR \text{ Rate } [\%] = \frac{\text{Non } EGR \text{ Air Quantity} \left[\frac{kg}{h}\right] - \text{Actual Air Quantity} \left[\frac{kg}{h}\right]}{\text{Non } EGR \text{ Air Quantity} \left[\frac{kg}{h}\right]} * 100 \quad [\text{Equation 1}]$$

Table 2 represents the non-EGR air quantity table (kg/h) according to the exemplary embodiment of the present disclosure.

TABLE 2

| | RPM | | | |
|---|---|---|---|---|
| | 800 | 1200 | 1600 | 2000 |
| Air Q | 10 | ... | ... | 800 |

Next, a deviation is calculated by comparing the actual EGR rate calculated by the ECU and the demand EGR rate as expressed by Equation 2 (S307).

$$\text{Deviation}[\%] = \text{Demand EGRRate}[\%] - \text{Actual EGR Rate}[\%] \quad \text{[Equation 2]}$$

When there is a difference between the target EGR rate and the actual EGR rate, the actual EGR rate is made to follow the target EGR rate through the PID control by adjusting an opening degree of the low-pressure EGR valve (LP-EGR valve) and the opening degree of the inhalation pressure control valve (IPCV) (S309). That is, an inhalation negative pressure at the inhalation manifold side is adjusted by controlling the inhalation pressure control valve (IPCV), so that the large quantity of EGR satisfying the demand EGR rate is controlled to be introduced from the EGR valve side.

Finally, when the actual EGR rate follows the target EGR rate, the PID control is terminated.

FIG. 4 is a diagram illustrating a numerical value interpretation model of the EGR control system according to an exemplary embodiment of the present disclosure.

A numerical value interpretation model was used to verify an effect of the EGR control according to the present disclosure. The 1-D interpretation model by Wave_Ricardo modeling with the "DL06" diesel engine, which satisfies the exhaust gas regulation standard of "Tier 4 Final" and was manufactured by the applicant, as a target was used as the numerical value interpretation model. Further, for comparison with the system in the related art, a result was separately analyzed when the low-pressure EGR valve was solely used and the inhalation pressure control valve and the low-pressure EGR valve were simultaneously used.

When the low-pressure EGR valve is solely used, as illustrated in FIG. 5, it is shown that the EGR supply quantity reaches a limit at a level of about 30%.

By contrast, when the low-pressure EGR valve is used together with the inhalation pressure control valve (IPCV), as illustrated in FIG. 6, it is shown that the EGR supply quantity satisfies up to 100% of the demand EGR rate according to an adjustment rate of the opening degrees of the IPCV and the low-pressure EGR valve.

As described above, according to the EGR control of the present disclosure, there provides a remarkably improved effect in that it is possible to definitely solve a problem of the supply of the large quantity of EGR which has been a large obstacle in implementation and practical use of low temperature combustion.

According to the aforementioned exemplary embodiment of the present disclosure, it is possible to expand a control range of an EGR rate by simultaneously adjusting opening degrees of the EGR valve and the inhalation pressure control valve (IPCV), thereby stably supplying the large EGR flow rate for implementing low temperature combustion. Particularly, the EGR rate of the EGR system in the related art has a limit of about 40%, but the EGR control system according to the present disclosure may sufficiently supply the EGR rate by up to 100%, thereby definitely solving an EGR supply problem.

Further, the low-pressure EGR loop, which is not subordinate to auxiliary machinery, such as a turbo charger, is used, so that even though an operating point of the auxiliary machinery is changed, an EGR rate is not subordinately changed, thereby more accurately controlling the EGR Rate. Further, it is possible to accurately control an EGR rate through a control logic using only an inhalation air quantity measured by the flow meter, and it is also possible to perform accurate EGR control satisfying a demand EGR rate through the PID control using an actual measurement value of an inhalation air quantity and the target EGR rate map.

The exemplary embodiments of the present disclosure have been described with reference to the accompanying drawings, but those skilled in the art will understand that the present disclosure may be implemented in another specific form without changing the technical spirit or an essential feature thereof.

Accordingly, the exemplary embodiment described in the present specification is illustrative for all of the aspects, and it should not understand that the exemplary embodiment described in the present specification limits the present disclosure, and the scope of the present disclosure is defined by the claims to be described below, and it should be interpreted that all modifications or modified forms derived from the scope of the claims and an equivalent scope thereof are included in the scope of the present disclosure.

The invention claimed is:

1. A method of controlling exhaust gas recirculation (EGR) for controlling recirculation of exhaust gas discharged from a combustion chamber of an engine, the method comprising:
    a data obtaining operation of obtaining data about an operation state of the engine including rpm, a fuel supply quantity, and an inhalation air quantity of the engine;
    a current EGR rate calculating operation of calculating a current EGR rate of supply gas based on the data;
    a demand EGR rate setting operation of setting a demand EGR rate matched with the rpm and the fuel supply quantity in a pre-made target EGR rate map;
    an error calculating operation of calculating a difference between the demand EGR rate and the current EGR rate; and
    a control operation of making the current EGR rate follow the demand EGR rate by changing a recirculation rate of the exhaust gas by adjusting an inhalation side pressure of the supply gas according to the difference,
    wherein the current EGR rate is calculated based upon a difference between the inhalation air quantity and a non-EGR air quantity divided by the non-EGR air quantity,
    wherein the non-EGR air quantity is matched with the rpm in a pre-made non-EGR air quantity table, and
    wherein the control operation is performed by mutually adjusting an opening degree of an inhalation pressure control valve, which is provided at an inhalation side of the supply gas and adjusts an inhalation negative pressure, and an opening degree of an EGR valve, which is provided at a discharge side of the exhaust gas and introduces the exhaust gas to the inhalation side of the supply gas.

2. The method of claim 1, wherein the exhaust gas is introduced to the inhalation side of the supply gas along an EGR supply path branched from the discharge side of the exhaust gas, and the EGR supply path forms an independent loop that is not subordinate to auxiliary machinery.

3. The method of claim 1, wherein the control operation includes controlling the current EGR rate to satisfy the demand EGR rate by proportional-integral derivative (PID) control using an actual measurement value of an inhalation air quantity and the target EGR rate map.

4. An apparatus for controlling exhaust gas recirculation (EGR), the apparatus comprising:

an engine including a speed sensor and an air flow meter;

an actuator configured to control opening degrees of an inhalation pressure control valve and an EGR valve; and an engine control unit configured to obtain data about an operation state of the engine from the engine including rpm, a fuel supply quantity, and an inhalation air quantity of the engine, calculate an actual EGR rate and a demand EGR rate based on the obtained data and a pre made target EGR rate map, and transmit a control signal to the actuator when there is a difference between the actual EGR rate and the demand EGR rate as a result of the calculation, wherein the engine control unit makes a current EGR rate follow the demand EGR rate by changing a recirculation quantity of exhaust gas by adjusting a pressure of an inhalation side of supply gas according to the difference, wherein the current EGR rate is calculated based upon a difference between the inhalation air quantity and a non-EGR air quantity divided by the non-EGR air quantity, wherein the non-EGR air quantity is matched with the rpm in a pre-made non-EGR air quantity table, and wherein the engine control unit is configured to perform by mutually adjusting an opening degree of an inhalation pressure control valve, which is provided at an inhalation side of the supply gas and adjusts an inhalation negative pressure, and an opening degree of an EGR valve, which is provided at a discharge side of the exhaust gas and introduces the exhaust gas to the inhalation side of the supply gas.

* * * * *